United States Patent [19]

Gamble

[11] 4,148,733
[45] Apr. 10, 1979

[54] FRAME SUPPORTING MECHANISM FOR CENTRIFUGAL HONEY EXTRACTORS

[76] Inventor: Banks R. Gamble, 2602 S. Holden Rd., Greensboro, N.C. 27407

[21] Appl. No.: 879,199

[22] Filed: Feb. 21, 1978

[51] Int. Cl.² .............................................. B01D 17/00
[52] U.S. Cl. ......................................... 210/361; 34/58
[58] Field of Search ...................... 210/58, 361; 34/58

[56] References Cited

U.S. PATENT DOCUMENTS 1,791,605  2/1931  Root .................................... 210/361

FOREIGN PATENT DOCUMENTS 1666 of  1897  United Kingdom ..................... 210/361

*Primary Examiner*—Frank Sever

[57] ABSTRACT

An upper retaining plate, including a plurality of radially extending, arcuately spaced slots therein, and a lower retaining plate, including a plurality of arcuately spaced apertures, are joined by a connecting rod and rotatably mounted within an outer stationary container. The honeycomb frames are inserted vertically through slots in the upper plate in such a manner that an extension of the top bar of the comb frame is seated securely in a corresponding aperture in the lower plate. The frames are thereby spaced arcuately around a central shaft and the shaft rotated at a speed adequate to centrifugally extract the honey from the frames. As the honey is drawn from both sides of the combs simultaneously it will flow downwardly along the walls of the outer container and collect in the bottom thereof.

3 Claims, 3 Drawing Figures

FRAME SUPPORTING MECHANISM FOR CENTRIFUGAL HONEY EXTRACTORS

BACKGROUND OF THE INVENTION

Centrifugal honey extractors are the subject of a number of U.S. patents dating back at least to the early 1920's. A review of this prior art reveals a number of extractors which feature the arranging of the comb frames along arcuately spaced radial paths around a central shaft within a container.

Further, some of the extractors include hinge-like devices or hinged baskets for holding the comb. The hinging mechanism in these extractors permits the rotation or other change in position of the honeycomb according to the theory that changing the position, and thus changing the application of centrifugal force against the comb, will effect a more complete extraction of the honey.

U.S. Pat. No. 1,730,593 to H. Root discloses a small size, power driven extracting apparatus which teaches the radial placement of the comb frames around a central shaft. In the Root patent the frames are placed securely in a regular position around the shaft and their position does not change during the extracting process.

A second U.S. patent to Root, U.S. Pat. No. 1,791,605, discloses a radial honey extractor of relatively large capacity with the comb frames held in the radial position by means of studs secured to the inside of the inner basket. Alternatively, Root teaches the use of radial notches within this basket to engage and hold the end bars of each frame. The use of this inner basket, however, may create problems for the hobbyist or small operator in that a portion of the honey may not get through the basket to the outer container, thereby necessitating the extra chore of manually removing honey from the basket along with that collected in the container. Additionally, the frame supports within the basket may retain honey and be difficult and time consuming to clean.

Both of the Root patents involve rather intricate designs and placement of the honeycomb frames require considerable manipulation of the supporting mechanism. Most of the other prior art discloses extractors designed for much larger processors and which are inapplicable to the hobbyist or small operater. The other smaller extractors (U.S. Pat. No. 3,007,255 to Mandrapa, for example) in the prior art generally feature a frame supporting mechanism which require a certain amount of assembly to load and altering of the position of the frames during extraction. Further such frames utilize multiple parts which are somewhat difficult to clean and if the parts are movable can malfunction.

To the inventor's knowledge there is not a small capacity centrifugal honey extractor having a frame supporting mechanism of such few movable parts or components and which is easy to manipulate.

SUMMARY OF THE PRESENT INVENTION

The honey extractor according to the present invention is a small capacity extractor, operated on the centrifugal principal and designed primarily for the hobbyist or home operator. The extractor generally includes an outer container which collects the honey as it is flung outwardly, and a honeycomb frame supporting mechanism made up of upper and lower retaining plates which support the honeycomb frames in a radial array around a central shaft. During operation the shaft, retaining plates, and honeycomb frames are caused to rotate either manually or by power means at a speed adequate to urge the honey from both sides of the combs simultaneously by centrifugal force. The honey extracted from the combs will move across the open space between the periphery of the retaining plate and the outer container walls, directly against the container walls where it will flow downwardly and collect in the bottom thereof.

The outer container includes side and bottom walls and an upper support over a supporting mechanism during use. An anchor means is provided for stablizing the extractor container to prevent it slipping or turning over during rotation.

The honeycomb frame supporting mechanism includes an upper retaining plate and a lower retaining plate rotatable together around a common vertical axis. In the preferred embodiment the plates are mounted on a central shaft which is caused to rotate, but other means may be provided whereby the retaining plates rotate around a stationary central shaft.

The upper retaining plate includes a plurality of slots extending radially from the axis, the slots being of a size substantially equal to the cross-sectional size of the honeycomb frame. The slots must be large enough to receive the frame vertically therethrough, yet small enough to retain the end bar substantially stationary therein during the extraction process.

The lower retaining plate includes a plurality of holes or apertures, each positioned below the outer portion of one of the slots in the upper retaining plate. These apertures receive and seat therein the conventional, relatively narrow extension of the honeycomb frame's top bar. This extension is normally used to support the frame within the hive or as a gripping means when the frame is being handled. Generally this extension of the top bar is approximately three-fourths inch beyond the adjoining end bar. Therefore the extension is inserted down into one of the apertures in the lower retaining plate and remains seated therein during the extraction process. In use the comb frames are inserted vertically, leading with the extension of the top bar, downwardly through a selected slot in the upper retaining plate until the extension is seated in the corresponding aperture in the lower plate. At that point the opposite end bar will be positioned and retained within the upper slot. Each frame is inserted likewise into the extractor. If the extractor is not to be used at full capacity the frames should be equally spaced around the retaining plates and the shaft for balance. After the frames are emplaced the cover is placed over the outer container, the container stabilizing means is engaged, and rotation begun.

Rotation of the extracting apparatus may be manual or by small electric motor. Because the rotation means is a matter of choice of available conventional devices, it will not be described herein.

Therefore, the objects of the present invention include:

1. The provision of a small size, non-reversing radial honey extractor for use by the hobbyist or home operator;
2. The provision of a radial honey extractor having easy loading comb frame support means with relatively few moving components; and
3. The provision of a centrifugal honey extractor having simple components which will effect rapid and maximum extraction of honey from the combs and collection thereof in the outer container.

Other and further objects of the invention will become apparent to those skilled in the art as the following detailed description is studied in conjunction with the accompanying drawings, in which.

DETAILED DESCRIPTION OF A PREFERRED EMBODIMENT

Figure 1:
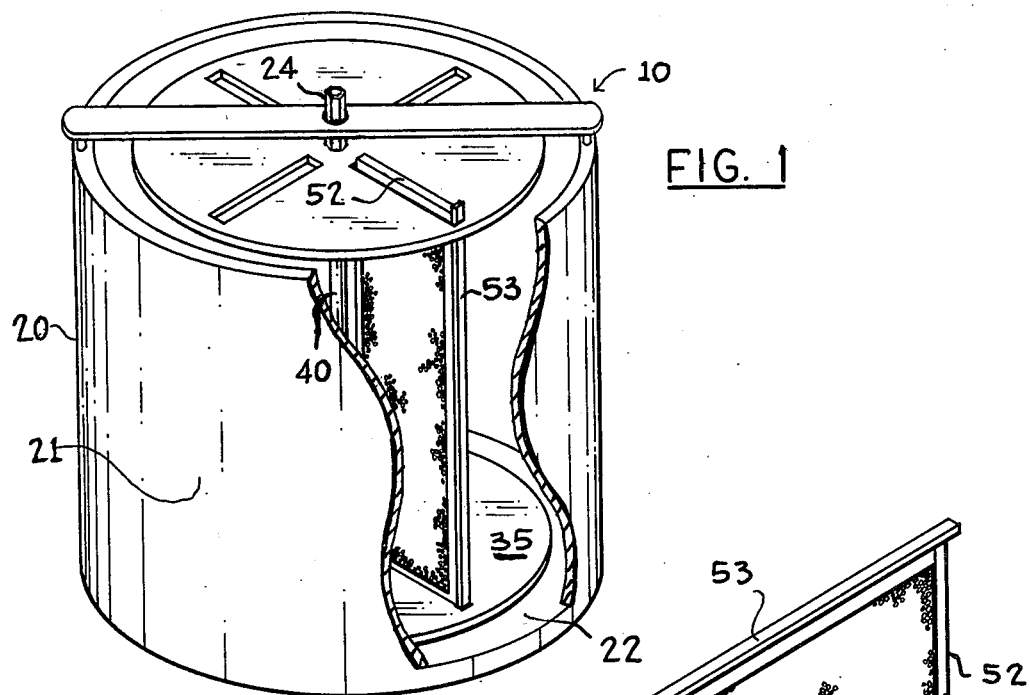
FIG. 1 is a perspective view, with parts broken away, of a preferred embodiment with comb frames in place for extraction.

Turning now to FIG. 1, a preferred embodiment of the honey extractor 10 is seen to include a preferably cylindrical outer container 20 and honeycomb frame support apparatus 15. The support apparatus 15 includes an upper retaining plate 30, a lower retaining plate 35, and a central shaft 40. The honeycomb frames 50 are illustrated in FIG. 1 as radially extending in a spaced array around the shaft in preparation for the extraction process. The outer container 20 as illustrated is preferably cylindrical in shape with a side wall 21 enclosed by a bottom wall 22 at the lower end. Construction material for the container 20 and for the extracting apparatus 15 may be stainless steel, other metal or one of the rigid, durable plastic materials which are easily obtained and relatively economical. For durability however, it is suggested that at least the extracting apparatus 15 be constructed of metal parts for durability.

The bottom wall 22 of outer container 20 may be solid as illustrated or may be designed to include a drainage outlet through which the honey may be drained into individual packages.

Figure 3:
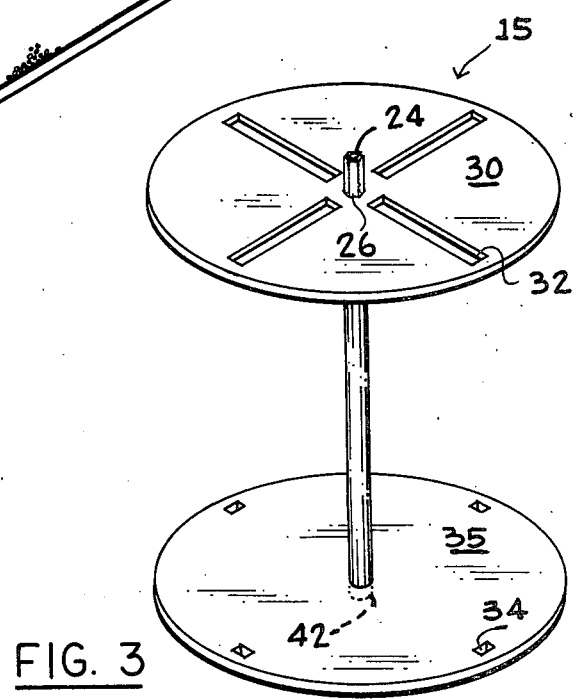
FIG. 3 is a perspective view of a preferred embodiment of the honeycomb frame supporting apparatus of the present invention.

The support apparatus 15 (FIG. 3) is separate and removable from container 20 and includes the upper frame retaining plate 30 and lower retaining plate 35 which are securely mounted on the respective ends of a central, rotating shaft 40. Although it will be described herein that the shaft 40 is rotatable, it should be recognized that other approaches and designs for rotating the retaining plates 30, 35 and thereby the frames 50 may be utilized.

Shaft 40 which is the primary coupling means between the upper and lower retaining plates, includes a terminal end 42 which engages a central point or aligning cup in the container bottom wall 22, and an upper receiving means 24 for receiving a desired rotation imparting device. In the preferred embodiment, the upper receiving means 24 includes an internal axially extending hexagonal socket 26 for coupling with a separate hexagonally shaped rod (not illustrated) which is the connecting means for a manual rotation device. The manual rotation device may be any of several known elements which include a hand crank operatively connected to a series of rotation gears. Alternatively, the receiving means 24 may be coupled to a small electric motor.

The upper retaining plate 30 includes a series of arcuately spaced, radially extending slots 32 through the surface thereof in positions corresponding to a series of correspondingly spaced apertures 34 in the surface of the lower retaining plate 35. So arranged, each aperture 34 underlies the outer end of one of the slots 32, and each corresponding slot and aperture pair cooperate to support the frame 50 therein during the extraction process. Further the slot in the upper plate 30 and the aperture in the lower plate 35 are the sole supporting elements of frame 50, and therefore loading and unloading is accomplished with a minimum of effort.

Figure 2:
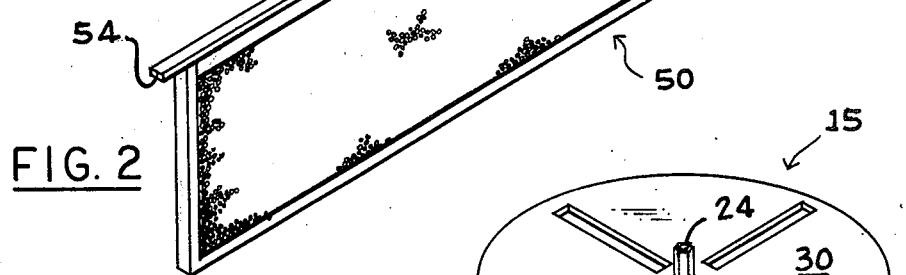
FIG. 2 is a perspective view of a conventional honeycomb frame of the type contemplated for use within the embodiment shown in FIG. 1.

The preferred comb frame 50, as illustrated in FIG. 2, is of a typical design, such as that shown including at least one extension 54 (and some two) of the top bar 53; which extension is for supporting the comb frame 50 in the hive or for gripping the frame and handling it. In the preferred embodiment of the extracting apparatus 15 the apertures 34 act as seats or retainers for the extension 54. The apertures are preferably spaced around the outer periphery of the retaining plate 35 so that the top bar 53 stands toward the exterior side of the extracting apparatus 15. Because of conventional placement of the comb frames within a hive it has been shown that placing the top bar 53 to the exterior of a centrifugal extractor results in increased production of honey due to the shaping of the comb as the cells tend to slant upwardly.

In use the frames 50 are inserted vertically, leading with extension 54 and with the top bar 53 facing outwardly, through the slots 32 downwardly to the point where extension 54 is seated in a selected aperture 34. At that point both ends of the frame will be supported with the end bar 52 retained within the slot 32 and held relatively stationary during the extraction process.

In the preferred embodiment only four to eight frame positions are allotted in the extraction apparatus 15 to maintain the relatively small size and permit manual rotation. If the extractor is not to be used to full capacity the operator must be careful to place the frames 50 into the extractor in balanced relationship to ensure maximum smooth rotation. Additionally, during rotation, the operator must strive to obtain the highest possible rotation speed to maximize extraction without unduly increasing air pressure within the extractor which can cause crushing of the combs.

Obviously the capacity of the extracting apparatus 10 may be increased to commerical usage without departing from the scope of the claims. However, it is felt that a capacity of four to eight frames will most efficiently and economically serve the home operator. The scope of the invention is limited only by the following claims.

What is claimed is:

1. A centrifugal honey extractor commprising:
 (a) a honeycomb frame having an extension means on at least one end of the top bar thereof,
 (b) a container having adjoining side and bottom walls;
 (c) a comb frame supporting apparatus removably and rotatably mounted within said container and including:
  (i) a supporting shaft;
  (ii) a first retaining plate mounted on the lower end of said shaft having a plurality of apertures arcuately spaced around said shaft through the surfaces of said plate, said apertures being of a dimension and shape such as to receive and retain therein said extension means;
  (iii) a second retaining plate mounted on the upper end of said shaft having a plurality of radially extending, arcuately spaced slots extending through the surfaces thereof in positions in which at least a portion of each of said slots overlies one of said apertures below, said slots being of a dimension and shape such that the comb frame is inserted vertically therethrough to a position whereby said extension means is securely seated within one of said apertures and the opposite end bar of said frame is retained within the corresponding one of said slots;

(d) means for rotating said frame supporting apparatus within said container whereby the honey from within the comb is thrown by centrifugal force against the side walls of the said container and collected therein.

2. A centrifugal honey extractor comprising:
(a) a cone frame having an extension means on at least one end of the top bar thereof;
(b) an outer container having adjoining side and bottom walls;
(c) an inner honeycomb frame supporting apparatus removably mounted within said container and including:
  (i) a central supporting shaft;
  (ii) a lower retaining plate mounted on the lower end of said shaft and having a series of openings arcuately spaced around said shaft through the surfaces of said plate, said series of openings being of a dimension and shape to receive and retain therein at least a portion of said end bar of a comb frame;
  (iii) an upper retaining plate mounted on the upper end of said shaft having a series of radially extending slots arcuately spaced in an array around said shaft and through the surfaces of said upper plate in positions corresponding to said series of openings, said series of slots being of a dimension and shape such that the comb frame is inserted vertically therethrough to a position whereby the leading end bar of the frame is securely seated and retained within one of said series of openings and the opposite end bar of said frame is retained within the corresponding one of said series of slots;
(d) means for rotating said support apparatus within said outer container whereby the honey from within the comb is thrown by centrifugal force against the side walls of said container and collected therein.

3. A centrifugal honey extractor comprising:
(a) a honeycomb frame having an extension means on at least one end of the top bar thereof,
(b) an outer container having adjoining side and bottom walls;
(c) an inner honeycomb frame supporting apparatus removably mounted within said container and including:
  (i) a central supporting shaft;
  (ii) a lower retaining plate mounted on the lower end of said shaft and having a plurality of apertures arcuately spaced around said shaft in the surface of said plate, said plurality of apertures being of a dimension and shape to receive and retain therein said frame extension means;
  (iii) an upper retaining plate mounted on the upper end of said shaft and having a series of radially extending slots arcuately spaced around said shaft and extending through the surfaces of said upper plate in positions corresponding to and overlying said plurality of apertures, said slots being of a dimension and shape such that the honeycomb frame is inserted vertically therethrough to a position whereby said frame extension means is securely seated within one of said apertures and the opposite end bar of the frame is retained within the corresponding one of said slots;
  (iv) said central shaft being the primary coupling means between said upper and lower plates;
(d) means for rotating said honeycomb frame supporting apparatus within said outer container whereby, when said frame support apparatus is rotated, the honey from within the comb is extracted by cengtrifugal force and thrown across the open space between the periphery of the upper and lower retaining plates against the side walls of said outer container and collected therein.

* * * * *